United States Patent Office 3,608,360
Patented Sept. 28, 1971

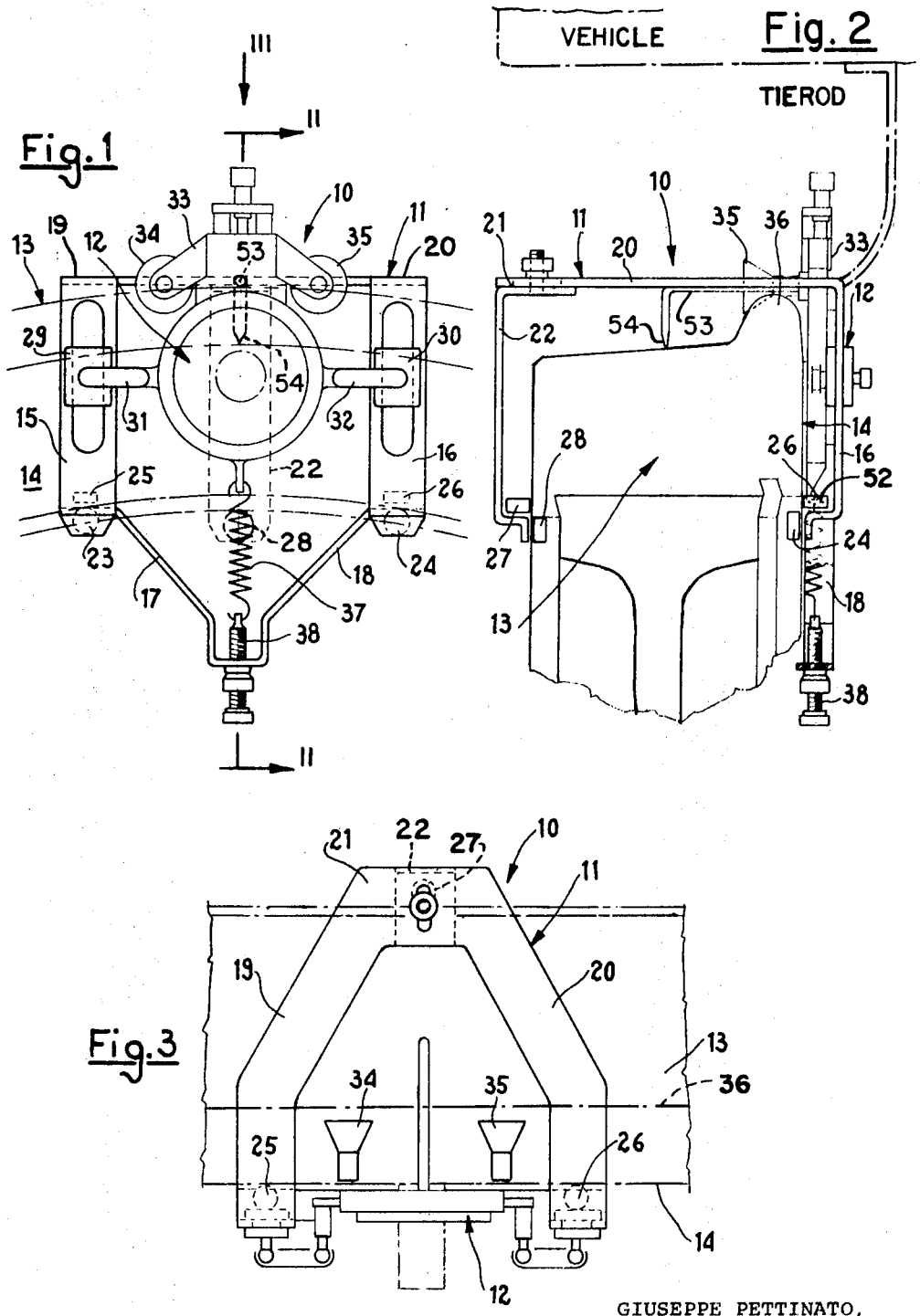

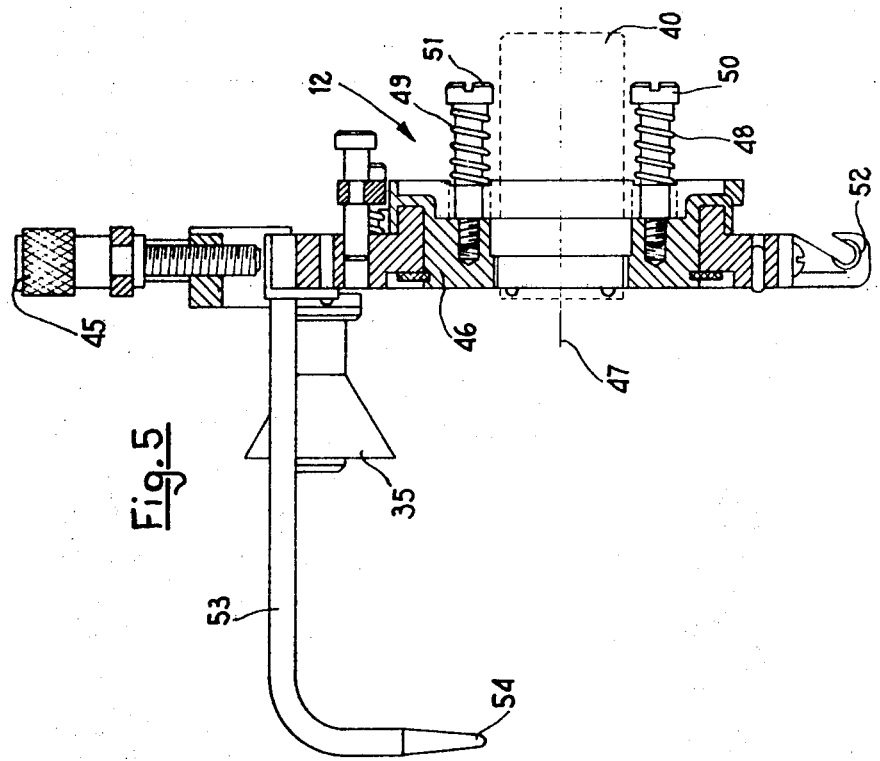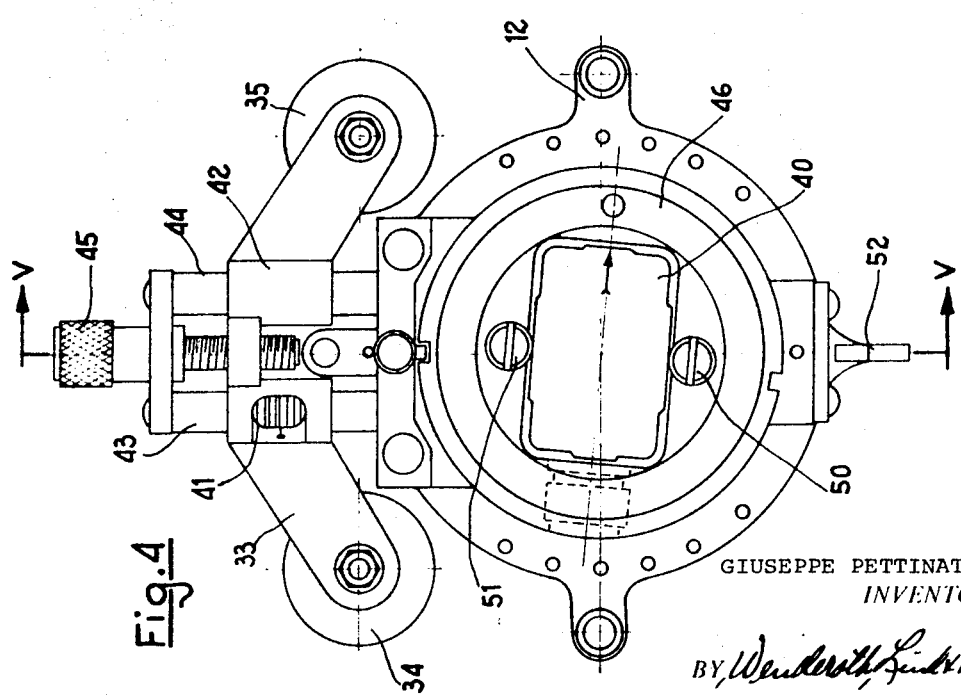

3,608,360
METHOD AND MEANS FOR CHECKING WHEEL SET TIRES IN ROLLING STOCK
Giuseppe Pettinato, 3 Via Campo d'Arrigo, Florence, Italy
Filed Dec. 3, 1968, Ser. No. 780,825
Claims priority, application Italy, Dec. 7, 1967, 23,653/67
Int. Cl. G01n 29/04
U.S. Cl. 73—67.5
9 Claims

ABSTRACT OF THE DISCLOSURE

A method and means for checking wheel tires mounted on railway vehicles by means of supersonic waves, said method and means consisting of slidingly connecting a checking probe with the wheel tire and scanning the tire body during a slow rotational movement of the wheel, while the probe is kept stationary. Said scanning operation can be performed by slowly advancing the railway vehicle while the probe is secured thereto or to a small carriage following said railway vehicle. Further, the probe comprises a transducer element which position can be suitably adjusted in respect of the checked tire surface.

BACKGROUND OF THE INVENTION

The invention relates to an improved method for checking, in particular by supersonic waves, the tires of wheel sets in rolling stock or in other rail running vehicles, as well as the means by which said method can be carried out, which consist of a probe or similar device having at least one checking element, e.g. a transducer, by which a scanning beam of supersonic waves is sent across the body of tire to be checked.

As well known, the non-destructive checks of rolling stock gain more and more importance with increasing average speed of trains, and thus with the increase in the stresses to which the different mechanical components thereof, and in particular the rotary members, are submitted. Above all, a check about the possible presence of cracks and other defects that may be very prejudicial for the efficiency of tires is of utmost importance, since said tires shall stand against unusually high stresses, particularly in the course of braking actions. Among the many heretofore known checking procedures the one utilizing a supersonic wave probe has proved to be particularly efficient; however, in the considered case, such check was heretofore performed only on tires of wheel sets removed from the related vehicle and never on tires of already assembled wheel sets and those already submitted to considerable stresses in operation.

SUMMARY OF INVENTION

The object of the present invention is to provide a method and means by which such check can be quickly and reliably performed on tires of working wheel sets without need to remove said sets from the related vehicle or to introduce special devices as required in other methods of non-destructive checking, thereby allowing a quick periodic control of all rolling stock in operation and a consequent remarkable increase in the safety of railway conveyances.

More particularly, the present invention concerns a method for checking, in particular by supersonic waves, wheel set tires characterized in that supersonic wave checking means are slidingly connected with a rotary surface of the body that is being inspected, and in that a scanning of the tire body is performed by moving said surface relative to said checking means which are kept stationary in respect of the railway vehicle, said relative motion being obtained by causing said railway vehicle to be slowly advanced.

According to the invention, for carrying out the above-stated method, a supersonic wave probe or a similar inspection means is provided, said probe comprising means by which it can be movably coupled with the body of the checked tire, means by which it can be kept in a stationary position in respect of said railway vehicle, means by which at least one transducer or the like is resiliently kept into contact with a rotary surface of said tire while this latter is turning in respect to the probe and means for adjusting the position of said transducer in respect of said tire contact surface.

The various features and details of the probe by which the above stated method is carried out will now be disclosed in the following description of a preferred embodiment thereof, that consists of a supersonic wave inspecting device as shown in the accompanying drawings, being both description and drawings given only as a not restrictive example of the invention.

DRAWINGS

FIG. 1 is a side view of a probe according to the invention, as operatively fitted on a tire of a railway vehicle wheel.

FIG. 2 is a cross-sectional view taken substantially on the line II—II of FIG. 1.

FIG. 3 is a plan view of the assembly of FIG. 1, as seen in the direction of arrow III of said FIG. 1.

FIG. 4 is an enlarged view, similar to that of FIG. 1, of the checking means portion of the probe as shown in FIG. 1.

FIG. 5 is a cross-sectional view, taken on the line V—V of FIG. 4.

PREFERRED EMBODIMENT

Figure 6:
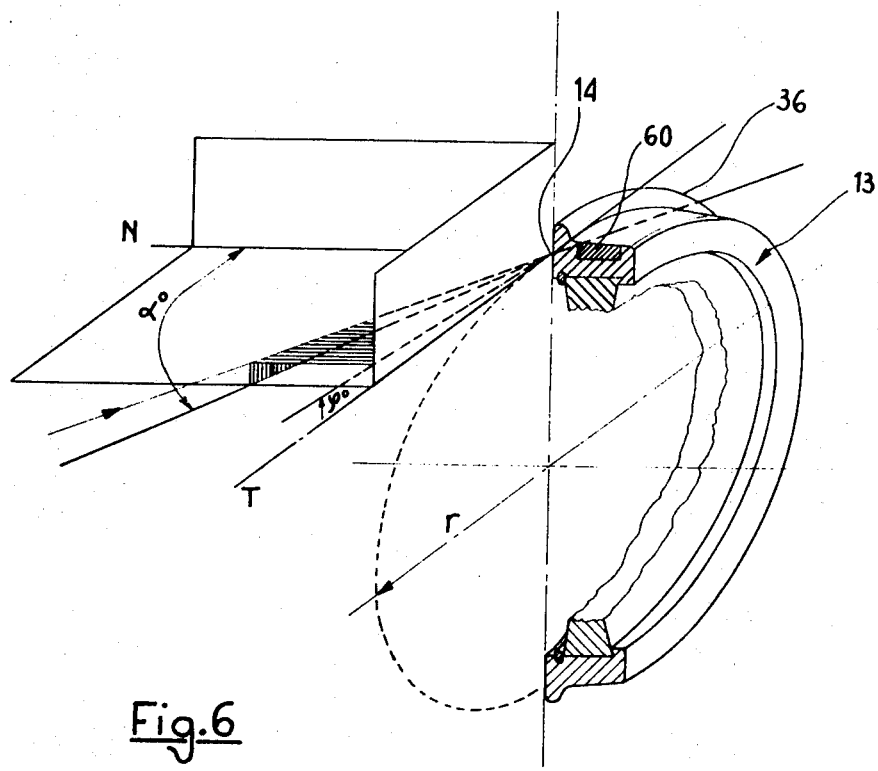
FIG. 6 is a perspective view of a tire of a railway vehicle, evidencing a particularly dangerous portion when inspected by the probe in question.

Referring now to FIGS. 1 to 3 inclusive, the probe 10 according to the invention, comprising a clamping bracket 11 and a support 12 for the checking element, i.e. a transducer or the like, is slidingly fitted on the tire 13 in such a manner that said support 12 be positioned against a side and in particular against the inner tire side 14.

The clamping bracket 11 consists of a plurality of arms, arranged in such a manner as to surround the section of tire 13 on three sides; in more details, assuming the probe be vertically fitted, it consists of two vertical arms 15 and 16 which are connected with each other by tie rods 17 and 18, and of two horizontal arms 19 and 20, extending from the former arms and joined together at 21 to form a vertical arm 22 which lies opposite to the above stated two vertical arms. Follower rolls carried by the arms 15 and 16 as well as by the arm 22, are adapted to roll on horizontal and vertical surfaces of tire, thus connecting the probe therewith, being said rollers indicated by the reference numerals 23, 24, 25, 26 and 27, 28 respectively. Slidingly connected to the vertical arms 15 and 16 by means of shoes 29, 30 and supporting and dragging arms 31 and 32, is said transducer support 12, which top section is connected with a yoke 33 carrying two loose fitted tapered rollers 34, 35 which are adapted to rest onto the inner flange 36 of tire 13. The support 12 is connected by a tension spring 37 with an adjustable hooking member 38 secured to lower sections of tie rods 17 and 18.

The above described design of assembly formed by the clamping bracket 11 and the support 12 allows the probe to be easily hooked to and unhooked from the tire body and to be easily kept connected in its operative position with the rotary tire; in particular, the support 12 can be thereby accurately kept in its operating position in front of the tire side 14, to carry out said supersonic scanning operation. The bracket 11 can be secured to the railway vehicle body by means of a tie rod in such a manner as, when said vehicle is moved, the transducer carried by the probe assembly travels all along a portion of inner tire side 14 and across the whole development of said tire, said tire position being suitably selected to perform the best possible scanning of tire body. The probe assembly could also be fitted in a stationary position in respect of the railway vehicle by means of an independent carriage (not shown) to which the probe assembly is rigidly secured, said carriage being fitted with rollers or the like by which it is kept into rolling engagement both with the wheel that is being checked and with the rail, thus running thereon when the railway vehicle is advanced and keeping the probe assembly properly coupled with the wheel tire.

The portion of the probe assembly, by which the scanning of wheel tire and the detection of possible defects thereof is performed, consisting of the support 12 along with all other components firmly connected thereto, is shown in more details in FIGS. 4 and 5, being said assembly secured to bracket 11 as previously stated. As it can be seen in said figures, the support 12 of transducer 40 is connected with the yoke 33 which carries the tapered or frusto-conical shaped rollers 34 and 35 in such a manner as to be allowed to perform a radial motion in respect of wheel tire. Said connection comprises guides 41 and 42, guide rods 43 and 44 and an adjusting screw 45, which means allow the transducer to be radially shifted across the side 14 of wheel tire 13. Said support 12 carries a disk 46 which can be turned continuously or step by step in a plurality of preestablished positions around an axis 47 that extends through the transducer and is perpendicular to side 14, said disk being fitted with means by which it can be locked in the most suitable selected position. Removably connected with said disk 46 is a transducer 40 which is biased outwardly and thus kept slightly pressed against the surface 14 by means of springs 48 and 49 fitted on adjusting screws 50 and 51 which can rotate together with said disk 46. Secured to said support 12 are, moreover, a hook 52 to which said spring 37 is engaged, and a stationary finger 53 which extends beyond the flange 36 of wheel tire 13 thereby bringing a related finger end 54 to rest onto the running surface and preferably onto the running tread of wheel tire 13. After the bracket 11 has been fitted on the wheel tire, it is possible to radially shift the support 12 in a radial direction across the surface 14 to bring the transducer 40 in the most suitable position for scanning the critical portions of wheel tire, said position being defined by means of the above stated pointer. Furthermore, the possibility is given to have said position linked with an angular arrangement which can be selected by turning the disk 46.

In particular, in addition to the longitudinally lying defects (i.e. parallel to wheel sides), which can be detected by a transducer emitting a straight beam of ultrasonic wages, also the crosswise directed defects (i.e., perpendicular to wheel sides) can be detected by a transducer emitting an angled beam. Owing to said adjustable mounting possibilities of the transducer, the considered probe provides for placement of a transducer emitting a suitably angled beam with the aid of reference finger 53 into a pre-established position relative to the wheel running tread, in order to detect defects extending in a crosswise direction and lying in a zone 60 (see FIG. 6) of a wheel tire, having a depth of about 20 mms. from the running tread, which zone is particularly susceptible to cracks caused by the braking thermal effects. By selectively placing the transducer 40 in special positions, it will be possible to inspect said zone under conditions wherein defects equivalent to a standard defect give a similar response on the oscilloscope, whatever their location within the considered zone may be, thereby providing the possibility of a comparative evaluation of such crosswise directed defects. It has been ascertained by the applicant that to the purposes of a check under said conditions within the considered zone, it is particularly advantageous to place a transducer by which a beam bent at an angle of 60 degrees is omitted, at a radial distance of about 70 mms. from the running wheel surface.

Among the many advantageous features of the probe assembly according to the invention, particular attention is to be given to the provision of an automatic coupling of the transducer with the inner tire side, thereby excluding the risk of negative influence that may be exerted by a wrong coupling on the formation of defect echo in the oscilloscope. Thus it is possible to carry out a really objective evaluation of the defect magnitude; moreover, said probe assembly also allows a supersonic contact coupling between two flat surfaces, i.e. the transducer surface and the tire side surface, which is undoubtedly the best coupling in order to carry out a check by supersonic waves. The support 12 of the considered probe assembly can also be resiliently hooked to an anchor cage of already known type, for checking single wheel sets not yet fitted to railway vehicles.

It is also to be noted that the above outlined provisions to have the probe assembly quickly and easily coupled in any position on the tire provides a remarkable decrease in the total check time, which is ordinarily mostly taken up by the probe mounting and removing operations. Finally, the stated provision of enabling said probe assembly to slide along the whole tire, while being kept continuously coupled therewith, provides for easy checking of the tire when mounted on the related railway vehicle by slowly moving this latter.

While the invention has been described with some details it is to be understood that the description is for the purpose of illustration only and is not definitive of the limits of the inventive idea. The right is reserved to make any changes in the details of construction and arrangement of parts as will fall within the purview of the appended claims.

I claim:

1. A method of inspecting for and detecting hidden defects in metallic wheels of rolling stock vehicles such as railroad vehicles without necessity of removing or lifting said wheels from the rail or wheel support surface, comprising the steps of:
   (a) slidingly coupling a supersonic wave generating and detecting means in association with at least one surface of a given wheel to be inspected, and
   (b) maintaining said detecting means stationary relative to the rotatable wheel, and scanning said wheel while moving said vehicle wheel surface relative to said detecting means, responsive to slowly moving said vehicle along a wheel support surface.

2. Apparatus for inspecting for and detecting hidden defects in metallic wheels of rolling stock vehicles, including railway vehicles, without the necessity of removing said vehicle or wheels from the support rail or other support surface, comprising:
   (a) support means for removably mounting a supersonic wave generating and detecting assembly means including transducer means in a slidingly coupling manner upon and relative to a rotatable vehicle wheel to be inspected so that at least a portion of said detection assembly means is in engagement with at least one surface of said wheel being inspected, and
   (b) means for maintaining said assembly means in a relatively stationary manner as related to said vehicle as compared to the relative rotation of the wheel to be inspected.

3. The apparatus as defined in claim 2 further including means for resiliently urging said transducer of said detecting assembly into operating contact with said one surface of said wheel while said wheel is being rotated and scanned by said detecting means.

4. The apparatus as defined in claim 3 further including means for adjusting the position of said transducer on the wheel surface which it contacts during operation.

5. The apparatus as defined in claim 2 wherein the support means for mounting said detecting means includes a bifurcated bracket of generally inverted U-shape form, having rolling support members mounted thereon, and means for resiliently biasing said rolling members against opposed surfaces of said wheel being inspected.

6. The apparatus as defined in claim 2 wherein the detecting assembly means includes a transducer and transducer support means disposed for resiliently biasing said transducer against an inboard surface of said wheel to be inspected, and said assembly means including a pair of spaced rollers for guidingly supporting said transducer with said rollers engaging a radially outward periphery of said vehicle wheel.

7. The apparatus as defined in claim 6 wherein said rollers are freely rotatable and of generally tapered or frusto-conical form engageable with a flange of a railway type vehicle wheel being inspected, and means extending transversely of the axis of said tapered rollers for resiliently biasing said rollers against the wheel periphery.

8. Apparatus as defined in claim 3 further including means for supporting said transducer and means for radially shifting the transducer support across a surface of said wheel which is perpendicular to the wheel axis, and means for rotatably shifting said transducer around an axis perpendicular to said wheel surface.

9. Apparatus as defined in claim 8 wherein said transducer support includes means for moving the transducer to predetermined radial distances from the outer peripheral tread or running surface, said latter means including a finger-like probe connected to said support and engageable with the running surface of said wheel in order to establish a good transducer position for inspecting a predetermined zone adjacent the wheel tread of running surface.

References Cited

UNITED STATES PATENTS

| | | | |
|---|---|---|---|
| 2,592,134 | 4/1952 | Firestone | 73—67.8 |
| 2,799,157 | 7/1957 | Pohlman | 3—67.7 |
| 3,028,751 | 4/1962 | Joy | 73—67.7X |
| 3,148,535 | 9/1964 | Lemelson | 73—67.5 |
| 3,266,300 | 8/1966 | Graboski | 73—67.8X |

RICHARD C. QUEISSER, Primary Examiner

C. E. SNEE III, Assistant Examiner

U.S. Cl. X.R.

73—67.8